(12) United States Patent
Kurzenberger et al.

(10) Patent No.: US 9,623,547 B2
(45) Date of Patent: Apr. 18, 2017

(54) HANDHELD WORK APPARATUS

(71) Applicant: ANDREAS STIHL AG & CO. KG, Waiblingen (DE)

(72) Inventors: Jan Kurzenberger, Köngen (DE); Jens Knauβ, Remshalden (DE); Johannes Menzel, Wernau (DE); Sebastian Friedrich, Korb (DE)

(73) Assignee: ANDREAS STIHL AG & CO. KG, Waiblingen (DE)

( * ) Notice: Subject to any disclaimer, the term of this patent is extended or adjusted under 35 U.S.C. 154(b) by 317 days.

(21) Appl. No.: 14/341,997

(22) Filed: Jul. 28, 2014

(65) Prior Publication Data

US 2015/0027745 A1 Jan. 29, 2015

(30) Foreign Application Priority Data

Jul. 27, 2013 (DE) .......................... 10 2013 012 511

(51) Int. Cl.
*B25F 5/00* (2006.01)
*B23Q 11/00* (2006.01)
*B27B 17/00* (2006.01)

(52) U.S. Cl.
CPC .......... *B25F 5/006* (2013.01); *B23Q 11/0032* (2013.01); *B27B 17/0033* (2013.01)

(58) Field of Classification Search
CPC ................................ B25F 5/006; F16F 1/3732
USPC ....................... 173/162.1, 162.2; 30/383, 386
See application file for complete search history.

(56) References Cited

U.S. PATENT DOCUMENTS

| 5,046,566 A | 9/1991 | Dorner et al. |
| 5,368,107 A | 11/1994 | Taomo |
| 6,799,642 B2 * | 10/2004 | Wolf ....................... B25F 5/006 173/162.1 |

(Continued)

FOREIGN PATENT DOCUMENTS

| DE | 101 24 621 A1 | 12/2002 |
| DE | 103 61 295 A1 | 7/2005 |

(Continued)

OTHER PUBLICATIONS

Kurzenberger; U.S. PTO Office Action, U.S. Appl. No. 14/444,021, May 26, 2016, 10 pgs.

(Continued)

*Primary Examiner* — Nathaniel Chukwurah
(74) *Attorney, Agent, or Firm* — Paul D. Strain, Esq.; Strain & Strain PLLC

(57) ABSTRACT

A handheld work apparatus has a motor unit comprising a drive motor. The drive motor drives a tool of the work apparatus, for example a saw chain. The apparatus has a grip unit with a handle that is vibrationally decoupled from the motor unit via an antivibration element. The antivibration element is connected to a first component of the grip unit via a holding device and a second component of the motor unit via a holding element. Arranged in the connection of the first component to the second component through the antivibration element is a predetermined breaking point formed in a third component that is replaceable independently of the first component and the second component. The strength of the connection of the first component to the second component through the antivibration element is lowest at this predetermined breaking point.

18 Claims, 4 Drawing Sheets

(56) References Cited

U.S. PATENT DOCUMENTS

| | | | |
|---|---|---|---|
| 6,905,042 B2 | 6/2005 | Eberhardt | |
| 6,994,068 B2 * | 2/2006 | Menzel | F02B 63/02 123/192.1 |
| 7,219,433 B2 | 5/2007 | Gorenflo et al. | |
| 7,293,330 B2 * | 11/2007 | Guip | B27B 17/0008 16/422 |
| 7,412,959 B2 * | 8/2008 | Wolf | B27B 17/0033 123/198 E |
| 7,942,212 B2 | 5/2011 | Zimmermann | |
| 8,225,514 B2 | 7/2012 | Guip et al. | |
| 8,567,520 B2 | 10/2013 | Wolf et al. | |
| 8,918,998 B2 | 12/2014 | Heinzelmann et al. | |
| 2002/0073558 A1 | 6/2002 | Tajima et al. | |
| 2011/0226501 A1 * | 9/2011 | Wolf | B25F 5/006 173/162.2 |
| 2011/0240324 A1 | 10/2011 | Kondo et al. | |
| 2015/0026988 A1 | 1/2015 | Kurzenberger et al. | |

FOREIGN PATENT DOCUMENTS

| | | |
|---|---|---|
| DE | 10 2007 022 115 A1 | 11/2008 |
| DE | 10 2007 048 887 A1 | 4/2009 |
| DE | 10 2010 011 986 A1 | 9/2011 |

OTHER PUBLICATIONS

European Search Report, Appl. No. 14002514.9, Aug. 25, 2015, 4 pgs.

Kurzenberger; U.S. PTO Notice of Allowance, U.S. Appl. No. 14/444,021, Sep. 29, 2016, 8 pgs.

Kurzenberger; U.S. PTO Corrected Notice of Allowability, U.S. Appl. No. 14/444,021, Jan. 6, 2017, 8 pgs.

* cited by examiner

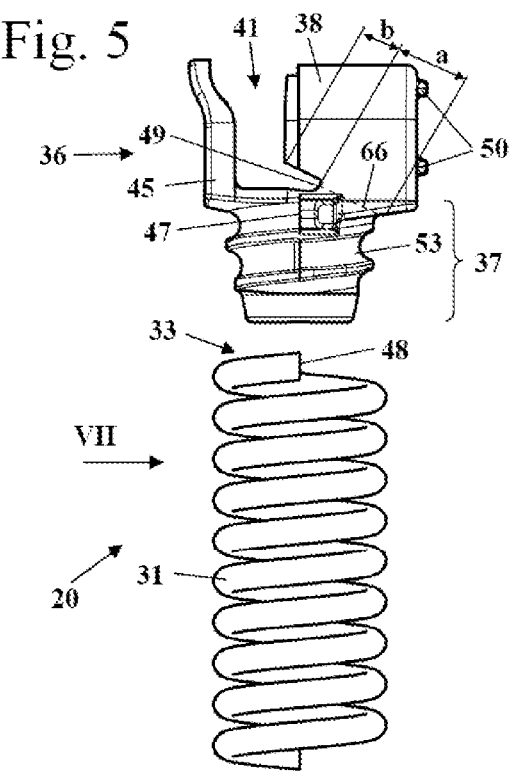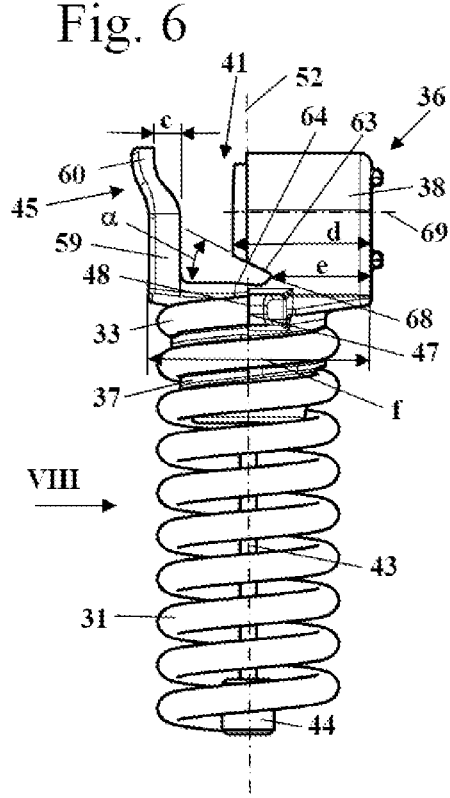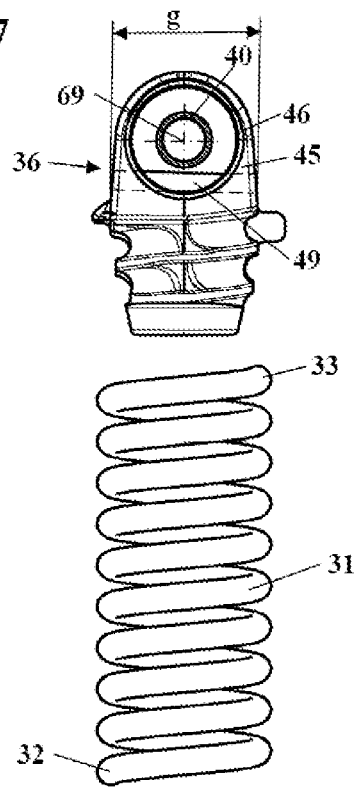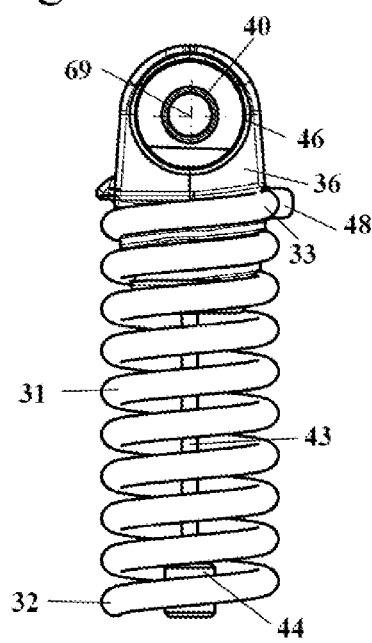

HANDHELD WORK APPARATUS

CROSS-REFERENCE TO RELATED PATENT APPLICATIONS

This application is based upon and claims the benefit of priority from prior German Patent Application No. 10 2013 012 511.1, filed Jul. 27, 2013, the entire contents of which are incorporated herein by reference in their entirety.

BACKGROUND

The application relates to a handheld work apparatus of the generic type.

DE 10 2007 022 115 A1 discloses a handheld work apparatus, specifically a chainsaw, wherein the grip unit and motor unit are vibrationally decoupled from one another via a plurality of antivibration elements. Some antivibration elements have helical springs in the ends of which plugs for fastening to the motor unit and grip unit are secured.

DE 101 24 621 A1 discloses an operating medium tank for a handheld work apparatus, wherein damping elements are plugged onto studs arranged on the operating medium tank. In order to avoid damage to the operating medium tank if a stud is broken off, a predetermined breaking point is provided between the stud and the wall of the operating medium tank. However, in the event of damage to the stud, the entire operating medium tank has to be replaced.

SUMMARY OF PREFERRED EMBODIMENTS

It is one object of the application to create a handheld work apparatus of the generic type, which has an advantageous construction. This and other objects are achieved by a handheld work apparatus according to the application.

In an exemplary embodiment, the handheld work apparatus has a motor unit with a drive motor. The drive motor includes a tool of the work apparatus, for example a saw chain. The apparatus also includes a grip unit having a handle, and the grip unit is vibrationally decoupled from the motor unit via an antivibration element. The antivibration element is connected to a first component of the grip unit via a holding device and to a second component of the motor unit via a holding element. The apparatus includes a predetermined breaking point formed in a third component that is replaceable independently of the first component and the second component. The predetermined breaking point is arranged in the connection of the first component to the second component through the antivibration element. In this arrangement, the strength of the connection of the first component to the second component through the antivibration element is lowest at the predetermined breaking point.

In another exemplary embodiment, the work apparatus has a motor unit and a grip unit, which is vibrationally decoupled via at least one antivibration element. The antivibration element is secured to a first component of the grip unit via a holding device and to a second component of the motor unit via a holding element. A predetermined breaking point is provided on a third component, wherein the third component is replaceable independently of the first and the second component. The strength of the connection of the first component to the second component is in this case lowest at the predetermined breaking point. This ensures that in the event of an overload the third component breaks at the predetermined breaking point. This arrangement avoids damage to or destruction of the first component or the second component, which are components of the grip unit and motor unit that are connected together via the antivibration element. Because the third component is replaceable independently of the first component and the second component, easy replacement of the third component in the event of damage or destruction is possible. The first component and the second component are in particular housing components of the grip unit and motor unit, the replacement of which is complicated and requires the demounting of further components of the work apparatus. As a result of the arrangement of a defined predetermined breaking point on a third component that is replaceable independently of the grip unit and the motor unit, it is easier to repair the work apparatus.

In yet another embodiment, the strength of the predetermined breaking point is advantageously less in all loading directions that usually occur during operation, in particular in all spatial directions, than the strength of all the other components in the connection of the first and second components. The strength of the first component and of the second component is also higher at the connection to the antivibration element than the strength of the third component at the predetermined breaking point. The loading directions that usually occur during operation are loads transverse to the longitudinal center axis of the antivibration element, which exert shear forces on the components of the connection, and loads in the direction of the longitudinal center axis of the antivibration element, which exert tensile forces on the components of the connection.

In still another embodiment, advantageously, the predetermined breaking point of the holding element is formed by a notch. The notch permits easy production of a defined predetermined breaking point. The notch effect in the notch ensures that the holding element tears at the predetermined breaking point and not in some other region. The angle between the side walls of the notch is in this case advantageously less than 90°, in particular less than 45°. As a result, a good notch effect is achieved. The notch is advantageously arranged such that the longitudinal center axis of the antivibration element extends through the notch in the unloaded state of the antivibration element. As a result, forces in the direction of the longitudinal center axis are introduced directly into the notch. Advantageously, the depth of the notch is at least 20% of the width, measured parallel to the depth of the notch, of a portion, adjoining the notch, of the third component. The depth of the notch is in particular at least 40% of the width, measured parallel to the depth of the notch, of the portion, adjoining the notch, of the third component. The width of the portion, adjoining the notch, of the third component is in this case the smallest width of the portion, adjoining the notch, of the third component and extends approximately in the direction of the breaking line along which the third component breaks.

In a further embodiment, advantageously, the bottom, that is to say the notch root of the notch, is oriented approximately in the longitudinal direction of the work apparatus. If the work apparatus is a chainsaw having a saw chain arranged in an encircling manner on a guide bar, then the notch root extends advantageously parallel to the plane of the guide bar.

In still another embodiment, the holding element is fixed advantageously releasably to the motor unit. Advantageously, the holding element has the predetermined breaking point, wherein the strength of the holding element at the predetermined breaking point is lower than the strength of the holding device. The holding element forms the third component. Because the holding element, via which the antivibration element is secured to the motor unit, has the predetermined breaking point, if the antivibration element is overloaded during operation, it is possible to ensure that the holding element on the motor unit breaks at the predetermined breaking point. As a result, damage to the holding device, by way of which the antivibration element is secured to the grip unit, can be avoided. If the holding element is connected firmly to the grip unit, it is possible as a result to avoid replacing parts of the grip unit. Because it is fixed releasably to the motor unit, the holding element can be replaced easily. As a result, repairs are easily possible. However, the third component can also be some other component of the connection, for example a fastening element of the holding element.

In yet a further embodiment, provision can also be made for the holding device to be fixed releasably to the grip unit and for the holding device to have the predetermined breaking point.

In a further embodiment of the application, the antivibration element comprises advantageously a helical spring. The longitudinal center axis of the antivibration element is advantageously the longitudinal center axis of the helical spring. Advantageously, the holding element has a fastening portion for fastening to the motor unit and a threaded portion for fastening to the helical spring. The predetermined breaking point is provided advantageously between the fastening portion and the threaded portion. As a result, the helical spring is separated reliably from the motor unit in the event of the holding element breaking, and so forces can no longer be transmitted between the motor unit and the grip unit via the antivibration element. This is desirable in order to prevent damage to other adjoining parts of the work apparatus, which require complicated replacement. A simple construction arises if the threaded portion bears an external thread and is screwed into the helical spring. The holding element is configured advantageously as a plug screwed into the helical spring.

In still yet another embodiment, easy fixing of the holding element is enabled when the holding element has a slot-like receptacle into which a fastening rib of the motor unit projects. This enables easy positioning of the holding element on the fastening rib of the motor unit during the mounting of the antivibration element. Advantageously, the fastening rib has a roof, which engages at least partially over the holding element. The roof allows the holding element to be pre-positioned during mounting. The roof advantageously forms a stop for the holding element such that during mounting the holding element can be positioned easily with one hand and fastened with the other hand.

According to another embodiment, the receptacle is advantageously bounded by the fastening portion, wherein the notch extends from that side of the fastening portion that faces away from the receptacle into the holding element. This produces a compact construction, and forces from the fastening rib can be introduced directly into the holding element. The longitudinal center axis of the antivibration element is in this case arranged advantageously in the direct spatial vicinity of the receptacle, such that a good introduction of force occurs.

By way of a further embodiment, advantageously, the receptacle is bounded on the side opposite the fastening portion by a lateral rib. The lateral rib advantageously has an opening through which a fastening element projects. That region of the lateral rib that faces away from the threaded portion is in this case advantageously offset with respect to the region facing the threaded section on the side facing away from the fastening portion. As a result of the opening in the lateral rib, the fastening element can be easily mounted and tightened. The offset between the two regions of the lateral rib ensures that, if the holding element breaks at the predetermined breaking point, that region of the lateral rib that faces away from the threaded portion cannot catch on the fastening element and as a result establish an operative connection between the motor unit and grip unit. As long as the fastening element has not yet been completely mounted, the lateral rib can rest against the fastening element, thereby making mounting easier.

In a further embodiment, advantageously, the holding device comprises a threaded portion screwed into the helical spring. The holding element advantageously has a receptacle for a breakaway coupling. The receptacle for the breakaway coupling is in this case provided advantageously in the threaded portion of the holding element. This ensures that the motor unit and grip unit are no longer connected after the holding element breaks at the predetermined breaking point, even via the breakaway coupling.

In yet another embodiment, advantageously, the grip unit comprises an operating medium tank, which forms the first component to which the antivibration element is secured. The holding device is formed advantageously on the operating medium tank. The fact that the holding device is formed directly on the operating medium tank and is not a separate component results in a simple construction. Because this arrangement dispenses with a fixing device for fixing the holding device to the operating medium tank, the operating medium tank can be embodied as a whole with a smaller overall height. As a result of the predetermined breaking point on the holding element, it is possible to avoid damage to the holding device on the operating medium tank if the work apparatus is not used properly. The predetermined breaking point ensures that the antivibration element tears at the separate holding element and not at the holding device on the operating medium tank in the event of an overload.

According to another embodiment of the application, the holding device is arranged advantageously on a top side of the operating medium tank, said top side being directed upward in a put-down position of the work apparatus. The operating medium tank is arranged advantageously next to a rear handle of the work apparatus. In particular when the work apparatus is a chainsaw, a cut-off grinder or the like having a rear handle, very large forces, in particular transverse forces and/or tensile forces can be exerted at the handle by the operator on an antivibration element arranged on the top side of the operating medium tank, for example when the tool jams during operation but the work apparatus continues to be operated by the operator. As a result of the provided predetermined breaking point, damage to adjacent components in the event of overstressing of the antivibration element can be avoided, because the holding element breaks at the predetermined breaking point before other components can be damaged. The strength of the holding element at the predetermined breaking point is in this case advantageously greater than the forces that occur during proper operation, such that breakage of the antivibration element at the predetermined breaking point is reliably avoided during proper operation.

In still another embodiment, the predetermined breaking point is formed by a notch. Advantageously, a longitudinal center axis of the antivibration element extends through the notch in the unloaded state of the antivibration element. Optionally, the depth of the notch is at least 20% of the width of a portion of the third component adjacent to the notch, wherein both the depth and the width are measured in the direction parallel to the depth of the notch.

In another embodiment the holding element includes the predetermined breaking point, in which the holding element is fixed releasably to the motor unit. In this example, the strength of the holding element at the predetermined breaking point is lower than the strength of the holding device. Optionally, the holding element includes a first fastening portion for fastening to the motor unit and a second fastening portion for fastening to a damping element of the antivibration element. In some configurations, the predetermined breaking point is arranged between the first fastening portion and the second fastening portion.

In still another embodiment, the antivibration element is a helical spring, and wherein a longitudinal center axis of the antivibration element is a longitudinal center axis of the helical spring. Optionally, the holding element has a first fastening portion for fastening to the motor unit and a second fastening portion for fastening to a damping element of the antivibration element. In this configuration, the second fastening portion is a threaded portion, which bears an external thread and has been screwed into the helical spring.

In yet a further embodiment, the holding element has a slot-like receptacle into which a fastening rib of the motor unit projects. The fastening rib may also have a roof, which engages at least partially over the holding element. In this example, the fastening portion may also bound a receptacle. Optionally, the notch extends from that side of the fastening portion that faces the receptacle into the holding element. Additionally, the receptacle may be bounded on the side opposite the first fastening portion by a lateral rib. In this configuration, the lateral rib has an opening through which a fastening element projects. The rub may also have a first region facing the second fastening portion and a second region facing away from the second fastening portion. This section region of the lateral rib is offset with respect to the first region on the side facing away from the first fastening portion.

In still yet a further embodiment of the application, the holding element has a receptacle for a breakaway coupling. Optionally, the holding device comprises a threaded portion screwed into the helical spring. The embodiment may include a grip unit having an operating medium tank, which forms the first component to which the antivibration element is secured. A holding device is also formed on the operating medium tank. This example may also include the arrangement of holding device on the top side of the operating medium tank, the top side being directed upward in a resting position of the work apparatus. Such an arrangement may also provide for arrangement of the operating medium tank next to a rear handle of the work apparatus.

Further objects, features, and advantages of the present application will become apparent from the detailed description of preferred embodiments which is set forth below, when considered together with the figures of drawing.

BRIEF DESCRIPTION OF THE DRAWINGS

An exemplary embodiment of the application is explained in the following text with reference to the figures of drawing, in which:

FIG. 5 shows an exploded illustration of the holding element and helical spring of the antivibration element from FIG. 4 in side view, FIG. 6 shows a side view of the holding element, helical spring and breakaway coupling of the antivibration element, FIG. 7 shows a side view in the direction of the arrow VII in FIG. 5, FIG. 8 shows a side view in the direction of the arrow VIII in FIG. 6.

DETAILED DESCRIPTION OF PREFERRED EMBODIMENTS

Figure 1:
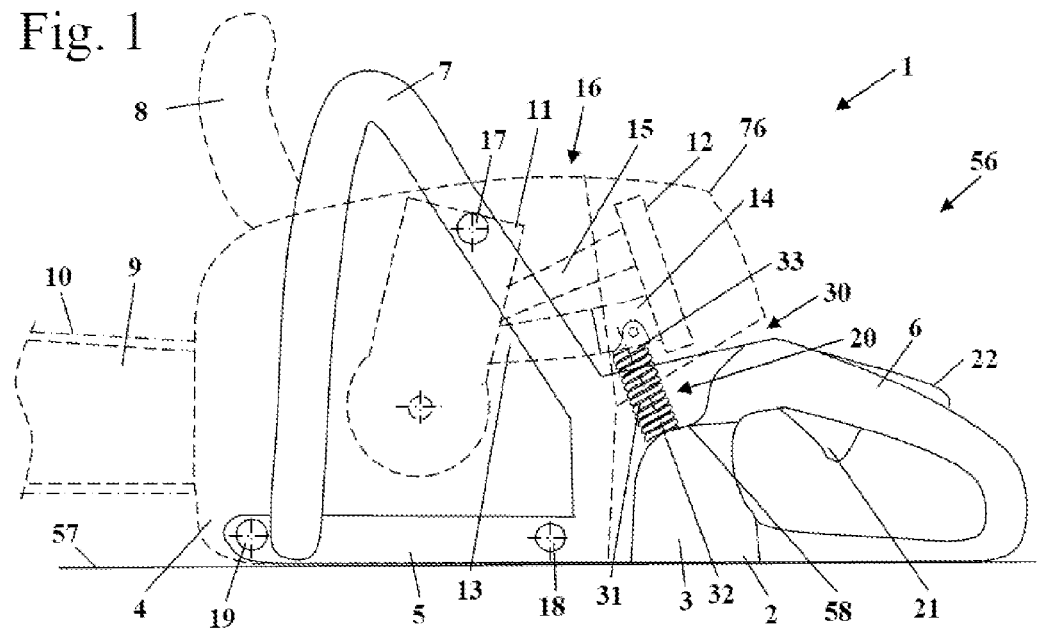
FIG. 1 shows a schematic side view of a chainsaw.

Turning to the figures of drawing, FIG. 1 schematically shows a chainsaw 1 as an exemplary embodiment of a handheld work apparatus. However, the handheld work apparatus can also be some other handheld work apparatus, for example a cut-off grinder or the like. The chainsaw 1 has a grip unit 2 and a motor unit 16 decoupled from the grip unit 2 via a vibration gap 30. In FIG. 1, for the sake of clarity, the motor unit 16 is drawn with dashed lines and the grip unit 2 with a solid line. The grip unit 2 comprises a rear handle 6 and a loop handle 7. The loop handle 7 engages over a housing 4 of the chainsaw 1. The grip unit 2 comprises a fuel tank 3, which is arranged next to the rear handle 6. The grip unit 2 furthermore has a rib 5 extending in the longitudinal direction of the chainsaw 1. Antivibration elements 18 and 19 are held on the rib 5. Advantageously, provision is made of two antivibration elements 18 and two antivibration elements 19 which are respectively arranged on both sides of the rib 5 between the grip unit 2 and motor unit 16.

A further antivibration element 17 is arranged between a drive motor 11 arranged in the housing 4 and the loop handle 7. The antivibration elements 17, 18, 19 may comprise one or more helical springs and/or damping elements made of plastics material, for example from rubber or from molded foam. The drive motor 11 is part of the motor unit 16 and in the exemplary embodiment is arranged above the rib 5. In the exemplary embodiment, the drive motor 11 is an internal combustion engine. Advantageously, the drive motor 11 is a single cylinder engine, in particular a two-stroke engine or a mixture-lubricated four-stroke engine. In the exemplary embodiment, the drive motor 11 is configured as a stratified scavenging engine. The drive motor 11 has an air duct 15 via which the scavenging air is drawn in via an air filter 12. Furthermore, the drive motor 11 has an intake duct 13 for feeding fuel/air mixture. A portion of the intake duct 13 is configured in a carburetor 14 via which fuel is fed to the drive motor 11.

Figure 2:
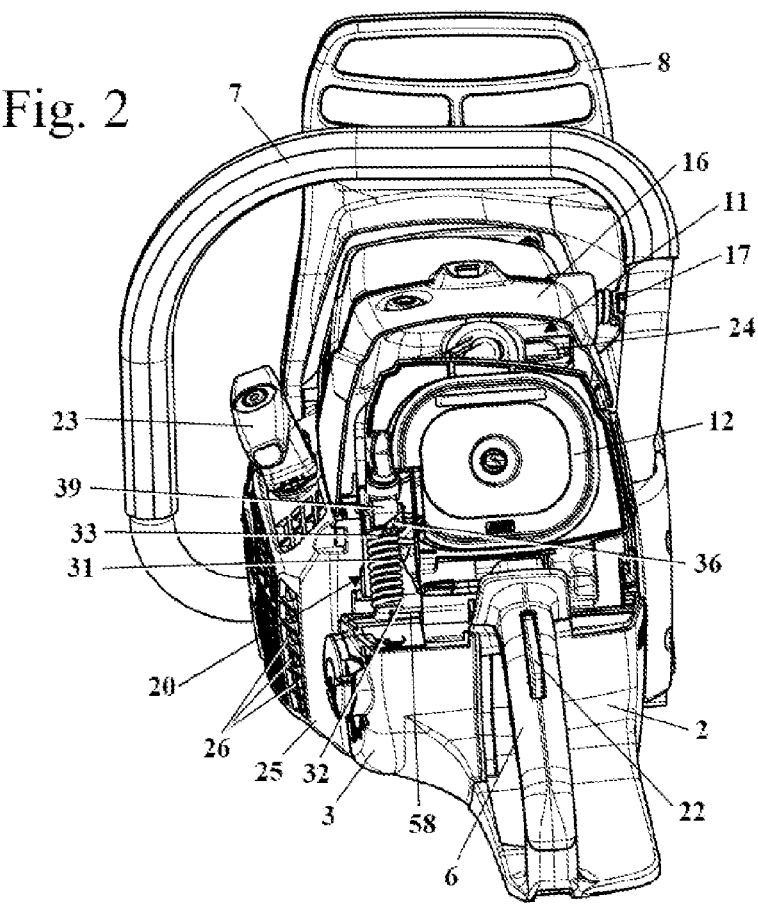
FIG. 2 and FIG. 3 show perspective illustrations of the chainsaw with the hood removed.
Figure 3:
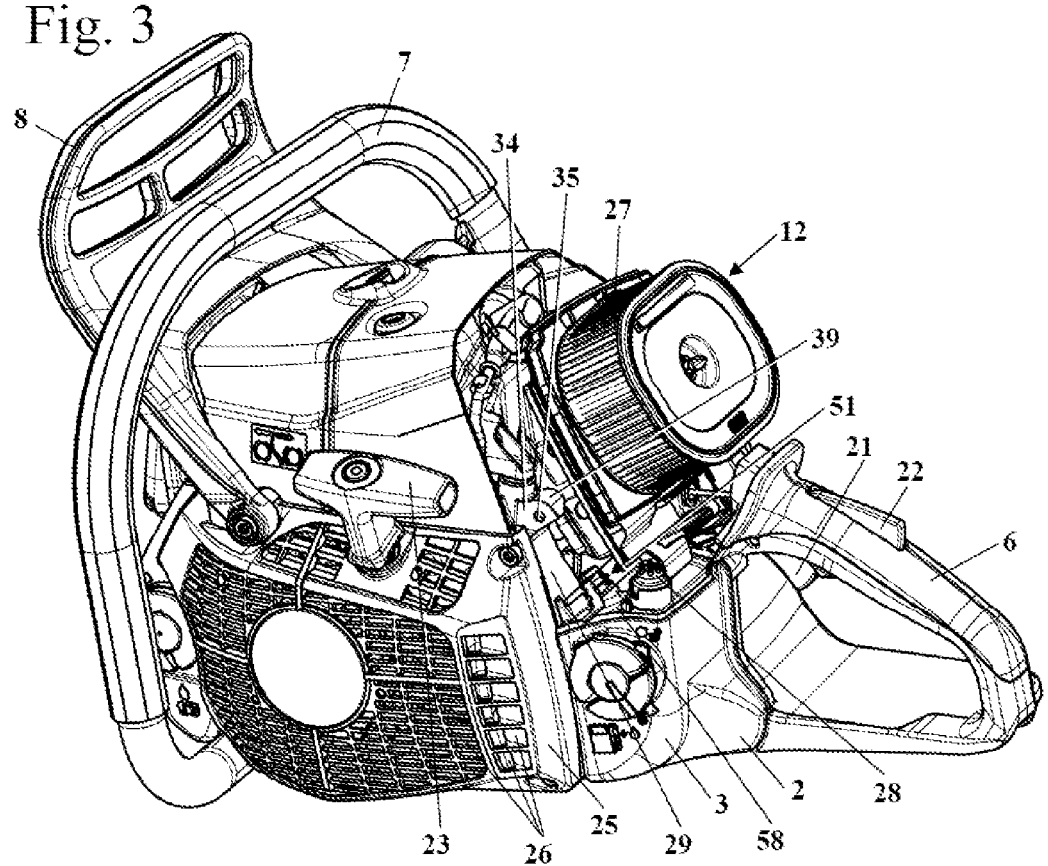

A throttle lever 21 for operating the drive motor 11 and a throttle lever lock 22 are arranged pivotably on the rear handle 6. A guide bar 9 on which a saw chain 10 is arranged in an encircling manner projects forward on that side of the housing 4 that faces away from the rear handle 6. The drive motor 11 drives the saw chain 10. A hand protection bracket 8 extends on that side of the loop handle 7 that faces the saw chain 10. The hand protection bracket 8 can be mounted pivotably on the housing 4 and serve for actuating a braking device (not shown) for the saw chain 10. As FIG. 1 shows, the housing 4 has a hood 76, which covers the air filter 12. In FIGS. 2 and 3, the hood 76 has been removed.

A further antivibration element 20 is secured to the grip unit 2, next to the fuel tank 3. In FIG. 1, the chainsaw 1 is shown in a resting position 56 in which the chainsaw 1 is standing on a planar, horizontal resting surface 57. The fuel tank 3 has a top side 58, which is directed, upward in the resting position 56. The antivibration element 20 is secured by way of a first end 32 to the top side 58 of the fuel tank 3 on the grip unit 2. By way of its second end 33, the antivibration element 20 is fixed to the motor unit 16, as will be described in more detail in the following text. As FIG. 1 also shows, the antivibration element 20 comprises a helical spring 31.

As FIG. 2 shows, the drive motor 11 has a cylinder 24 to which the antivibration element 17 is fixed. In order to start the drive motor 11, use is made of a starter (not shown) arranged beneath a flywheel cover 25. A starter handle 23 of the starter projects out of the housing 4 of the chainsaw 1. As FIG. 2 also shows, the flywheel cover 25 has a multiplicity of cooling air openings 26 through which cooling air for the drive motor 11 is sucked into the housing 4.

FIG. 2 also shows the arrangement of the antivibration element 20 on the top side 58 of the fuel tank 3 in detail. In FIG. 2, the air filter 12 and the antivibration element 20 are visible on account of the removed hood 76. As FIGS. 1 and 2 show, the helical spring 31 of the antivibration element 20 is oriented in the longitudinal direction of the chainsaw 1, that is to say approximately parallel to the plane of the guide bar 9 (FIG. 1) and inclined forward with its second end 33. Thus, the second end 33 is located in front of the first end 32 of the antivibration element 20 in the longitudinal direction of the chainsaw 1.

FIG. 3 shows the arrangement without the helical spring 31 of the antivibration element 20. As FIG. 3 shows, a holding device 51, which is in the form of a plug having a groove extending helically around the outer circumference of the plug, is arranged on the top side 58 of the fuel tank 3. In the exemplary embodiment, the holding device 51 is held firmly on the fuel tank 3, in particular formed integrally with the fuel tank 3. As FIG. 3 shows, the holding device 51 is arranged next to a venting valve 28 arranged on the top side 58 of the fuel tank 3. In FIG. 3, the filter material 27 of the air filter 12 is also visible. Screwed into the holding device 51 is the helical spring 31 of the antivibration element 20 (FIG. 2). The helical groove of the holding device 51 forms an external thread. The housing 4 has, next to the flywheel cover 25, a wall 29 on which a fastening rib 34 is arranged. The fastening rib 34 has a fastening opening 35 for a holding element 36 (not shown in FIG. 3) of the antivibration element 20. The holding element 36 is illustrated in a partially visible manner in FIG. 2 and in a perspective manner in FIG. 4. In the exemplary embodiment, the fastening opening 34 is a threaded bore. The fastening rib 34 also has a roof 39, which engages over the holding element 36, as is also illustrated in FIG. 2. The roof 39 forms a stop for the holding element 36 during mounting.

Figure 4:
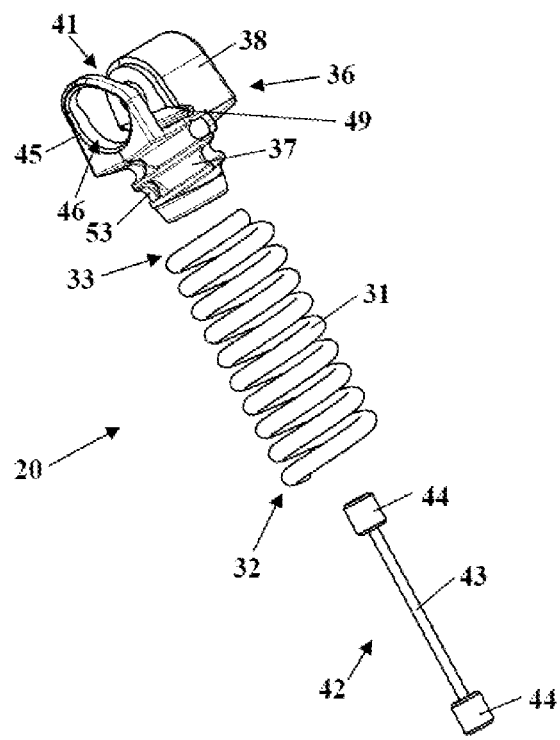
FIG. 4 shows a perspective exploded illustration of an antivibration element of the chainsaw.

FIG. 4 shows the construction of the antivibration element 20 without the holding device 51 in detail. The holding element 36 has a threaded portion 37 which serves for fastening to the helical spring 31. The threaded portion 37 has an external thread 53, which is in the form of a helical groove and onto which the helical spring 31 is screwed by way of its second end 33. The holding element 36 has a fastening portion 38 for fastening to the grip unit 2 (FIG. 1), specifically to the fastening rib 34 of the housing 4 (FIG. 3). Arranged between the threaded portion 37 and the fastening portion 38 is a notch 49, which forms a predetermined breaking point of the antivibration element 20. The holding element 36 has a receptacle 41 for the fastening rib 34, said receptacle 41 being bounded on one side by the fastening portion 38 and on the opposite side by a lateral rib 45. The lateral rib 45 has an opening 46 through which a fastening element for the holding element 36 can be mounted.

As FIG. 4 also shows, the antivibration element 20 has a breakaway coupling 42, which comprises a securing cable 43. The securing cable 43 is advantageously a shear-resistant cable, for example a steel cable. The securing cable 43 has at each end a nipple 44 that is firmly connected to the securing cable 43. In the event of the helical spring 31 breaking, the holding element 36 is held on the holding device 51 by the breakaway coupling 42, such that the grip unit 2 and motor unit 16 remain connected together via the breakaway coupling 42.

FIGS. 5 to 8 show the construction of the antivibration element 20 without the holding device 51 integrally formed on the fuel tank 3 in detail. As FIG. 5 shows, the threaded portion 37 has an end stop 47. As FIG. 8 shows, an end surface 48 at the second end 33 of the helical spring 31 bears against the end stop 47 when the helical spring 31 has been screwed onto the threaded portion 37, i.e. when the antivibration element 20 has been mounted. As FIGS. 5 and 6 show, the receptacle 41 is approximately U-shaped. The notch 49 is arranged at the bottom of the receptacle 41 and extends from the bottom of the receptacle in the region between the threaded portion 37 and the fastening portion 38. In FIG. 5, the breaking line 66 is indicated by way of dashed lines. At the breaking line 66, the fastening portion 38 and the threaded portion 37 break apart when the antivibration element is loaded with forces greater than those that occur during proper operation in the direction of its longitudinal center axis 52 shown in FIG. 6. The strength of the holding element 36 in the direction of the longitudinal center axis 52 of the antivibration element 20 is in this case less at the predetermined breaking point than the strength of the holding device 51 in the direction of the longitudinal center axis 52 of the antivibration element 20, such that the holding element 36 breaks at the predetermined breaking point before the holding device 51 is damaged (FIG. 3). In this case, the longitudinal center axis 52 corresponds to the longitudinal center axis of the helical spring 31.

As FIG. 5 shows, the depth b of the notch 49 is less than the width a of the holding element 36 at the breaking line 66. The depth b is advantageously at least 20% of the width a. In particular, the depth b is at least 40% of the width a. The depth b and the width a are in this case measured in the same direction, specifically in the longitudinal direction of the breaking line 66. As FIG. 5 also shows, the fastening portion 38 has, on the side facing away from the receptacle 41, two studs 50, which simplify mounting.

As FIG. 6 shows, the notch 49 (FIG. 5) has a first side wall 63, which is formed on the fastening portion 38, and a second side wall 64, which extends next to the threaded portion 37. The two side walls 63 and 64 enclose an angle α, which is much less than 90°. The angle α is advantageously less than 45°. In the exemplary embodiment, the angle α is approximately 30°. Because the side walls 63 and 64 extend at an acute angle α with respect to one another, a good notch effect is achieved at the bottom 68 of the notch 49. As a result, it is possible to ensure that the holding element 36 breaks at the notch 49 before other components of the chainsaw 1 are damaged.

As FIG. 6 shows, the holding element 36 has a width d at the fastening portion 38. The width d is greater than the width e of the holding element 36. On that side of the notch that is opposite the fastening portion 38, the holding element 36 has a width f, which is much greater than the width d and the width e. The width e is advantageously less than about 90%, in particular less than about 80% of the width d. The width f is advantageously more than about 120%, in particular more than about 150% of the width d. The width d, the width e and the width f are in this case measured perpendicularly to the longitudinal center axis 52. The notch 49 is thus arranged at the narrowest point of the connection between the helical spring 31 and the fastening rib 34 (FIG. 3). As FIG. 6 also shows, the longitudinal center axis 52 extends through the notch 49. As a result, a good introduction of force is achieved in the region of the predetermined breaking point.

The lateral rib 45 has a first region 59, which adjoins the threaded portion 37, and a second region 60, which is located away from the threaded portion 37. The second region 60 is offset with respect to the first region 59 by an offset c toward the outside, that is to say to the side facing away from the fastening portion 38. As a result, the receptacle 41 is narrower next to the first region 59 above the notch 49 than it is next to the second region 60. The offset c can be for example about 50% to about 200% of the depth b of the notch 49.

Figure 9:
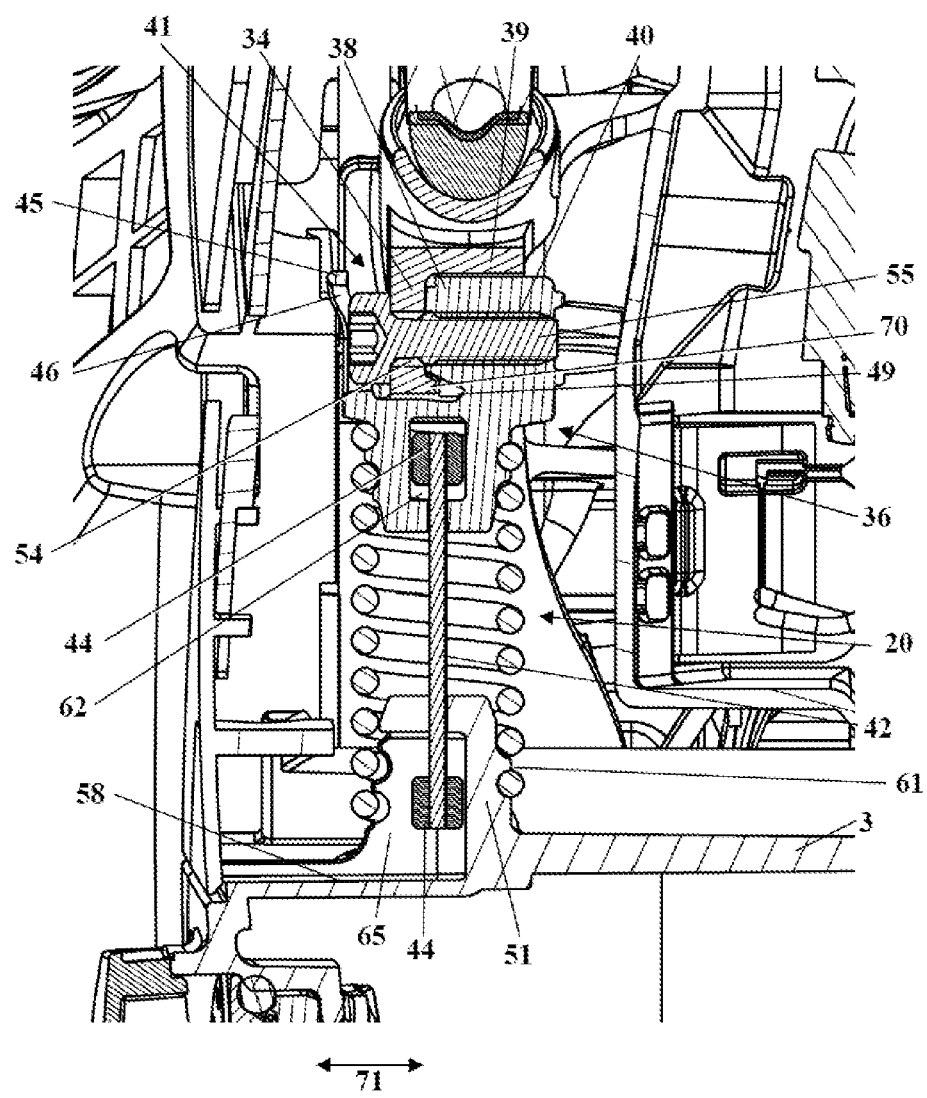
FIG. 9 shows an enlarged sectional illustration through the antivibration element on the chainsaw.

As FIG. 9 shows, a fastening screw 55 serves for fastening the holding element 36. The head of the fastening screw 55 projects partially into the opening 46 in the lateral rib 45. The offset c is selected such that the second region 60 (FIG. 6) cannot come to rest against the head of the fastening screw 55 when the holding element 36 breaks at the notch 49. This ensures that the motor unit 16 is no longer connected to the grip unit 2 (FIG. 1) via the antivibration element 20 when the holding element 36 breaks at the predetermined breaking point.

As FIGS. 7 and 8 show, the holding element 36 has a threaded opening 40 into which the fastening screw 55 is screwed. The depth g of the holding element 36, said depth g being measured perpendicularly to the longitudinal center axis 69 of the threaded opening 40 and perpendicularly to the longitudinal center axis 52 of the antivibration element 20 (FIG. 6), is approximately constant from the threaded portion 37 (FIG. 5) to the longitudinal center axis 69. In this region, the cross section of the holding element 36 perpendicularly to the longitudinal center axis 52 is smallest at the bottom 68 (FIG. 6) of the notch 49. As is indicated schematically in FIG. 7, notch 49 extends in this case over the entire depth g of the holding element 36. The outside diameter of the opening 46 is much greater than the diameter of the threaded opening 40. As FIG. 9 shows, the diameter of the opening 46 is somewhat greater than the diameter of the head of the fastening screw 55.

As FIG. 9 shows, the fastening rib 34 of the housing 4 of the chainsaw 1 projects into the receptacle 41. The fastening screw 55 projects through a through-opening 54 in the fastening rib 34 and is screwed into the threaded opening 40 in the holding element 36. As FIG. 9 also shows, the roof 39 bears against the fastening portion 38 of the holding element 36. The fastening rib 34 has a lower edge 70, which engages in the notch 49 and as a result prefixes the holding element 36 on the fastening rib 34 before the fastening screw 55 is fitted. Also visible in FIG. 9 is a threaded portion 61 of the holding device 51, into which the helical spring 31 (FIG. 2) has been screwed. As FIG. 9 also shows, a nipple 44 of the breakaway coupling 42 (FIG. 4) is held in a slot 65 in the holding device 51. The second nipple 44 of the breakaway coupling 42 is arranged in a receptacle 62 of the holding element 36. The nipples 44 each engage behind a portion of the holding device 51 or holding element 36.

A double arrow 71, which illustrates a possible transverse load on the antivibration element 20 is indicated by way of example in FIG. 9. During operation, the operator can exert lateral forces on the rear handle 6 (FIG. 1) in the event of a jammed guide bar 9 and as a result move the fuel tank 3 (FIG. 1) in the direction of the double arrow 71 with respect to the fastening rib 34. As a result, transverse forces act on the antivibration element 20, said transverse forces resulting, in the event of excessive load, in the connection of the fuel tank 3 and fastening rib 34 breaking at the point with the lowest strength, specifically at the notch 49. The predetermined breaking point is in this case arranged advantageously such that the holding element 36 snaps off at the notch 49. As shown in FIG. 9 in conjunction with FIG. 3, the bottom 68 of the notch 49 (FIG. 6) extends approximately in the longitudinal direction of the chainsaw 1. The bottom 68 extends preferably parallel to the plane of the guide bar 9 (FIG. 1).

The foregoing description of preferred embodiments of the application has been presented for purposes of illustration and description only. It is not intended to be exhaustive or to limit the application to the precise form disclosed, and modifications and variations are possible and/or would be apparent in light of the above teachings or may be acquired from practice of the application. The embodiments were chosen and described in order to explain the principles of the application and its practical application to enable one skilled in the art to utilize the application in various embodiments and with various modifications as are suited to the particular use contemplated. It is intended that the scope of the application be defined by the claims appended hereto and that the claims encompass all embodiments of the application, including the disclosed embodiments and their equivalents.

The invention claimed is:

1. A handheld work apparatus comprising:
   a motor unit comprising a drive motor, wherein the drive motor drives a tool of the work apparatus;
   a grip unit comprising a handle, wherein the grip unit is vibrationally decoupled from the motor unit via an antivibration element, wherein the antivibration element is connected to a first component of the grip unit via a holding device, and wherein the antivibration element is connected to a second component of the motor unit via a holding element;
   a predetermined breaking point, wherein the predetermined breaking point is formed in a third component that is replaceable independently of the first component and the second component, wherein the predetermined breaking point is arranged in the connection of the first component to the second component through the antivibration element, and wherein the strength of the connection of the first component to the second component through the antivibration element is lowest at the predetermined breaking point.

2. The work apparatus according to claim 1,
   wherein the predetermined breaking point is formed by a notch.

3. The work apparatus according to claim 2,
   wherein a longitudinal center axis of the antivibration element extends through the notch in the unloaded state of the antivibration element.

4. The work apparatus according to claim 2,
   wherein the depth of the notch is at least 20% of the width of a portion of the third component adjacent to the notch, wherein both the depth and the width are measured in the direction parallel to the depth of the notch.

5. The work apparatus according to claim 4,
   wherein the holding element has a receptacle for a breakaway coupling.

6. The work apparatus according to claim 4,
   wherein the holding device comprises a threaded portion screwed into the helical spring.

7. The work apparatus according to claim 4,
wherein the grip unit comprises an operating medium tank, which forms the first component to which the antivibration element is secured, and wherein the holding device is formed on the operating medium tank.

8. The work apparatus according to claim 7,
wherein the holding device is arranged on a top side of the operating medium tank, and wherein the top side is directed upward in a resting position of the work apparatus.

9. The work apparatus according to claim 7,
wherein the operating medium tank is arranged next to a rear handle of the work apparatus.

10. The work apparatus according to claim 1,
wherein the holding element comprises the predetermined breaking point, wherein the holding element is fixed releasably to the motor unit, and wherein the strength of the holding element at the predetermined breaking point is lower than the strength of the holding device.

11. The work apparatus according to claim 10,
wherein the holding element comprises a first fastening portion for fastening to the motor unit and a second fastening portion for fastening to a damping element of the antivibration element.

12. The work apparatus according to claim 11,
wherein the predetermined breaking point is arranged between the first fastening portion and the second fastening portion.

13. The work apparatus according to claim 11,
wherein the holding element has a slot-like receptacle into which a fastening rib of the motor unit projects.

14. The work apparatus according to claim 13,
wherein the fastening rib has a roof which engages at least partially over the holding element.

15. The work apparatus according to claim 13,
wherein the predetermined breaking point is formed by a notch, wherein the receptacle is bounded by the fastening portion, wherein the notch extends from that side of the fastening portion that faces the receptacle into the holding element.

16. The work apparatus according to claim 13,
wherein the receptacle is bounded on the side opposite the first fastening portion by a lateral rib, wherein the lateral rib has an opening through which a fastening element projects, wherein the lateral rib has a first region facing the second fastening portion and a second region facing away from the second fastening portion, and wherein the second region of the lateral rib is offset with respect to the first region on the side facing away from the first fastening portion.

17. The work apparatus according to claim 1,
wherein the antivibration element comprises a helical spring, and wherein a longitudinal center axis of the antivibration element is a longitudinal center axis of the helical spring.

18. The work apparatus according to claim 17,
wherein the holding element comprises a first fastening portion for fastening to the motor unit and a second fastening portion for fastening to a damping element of the antivibration element, and wherein the second fastening portion is a threaded portion which bears an external thread and has been screwed into the helical spring.

* * * * *